Figures 1, 2:
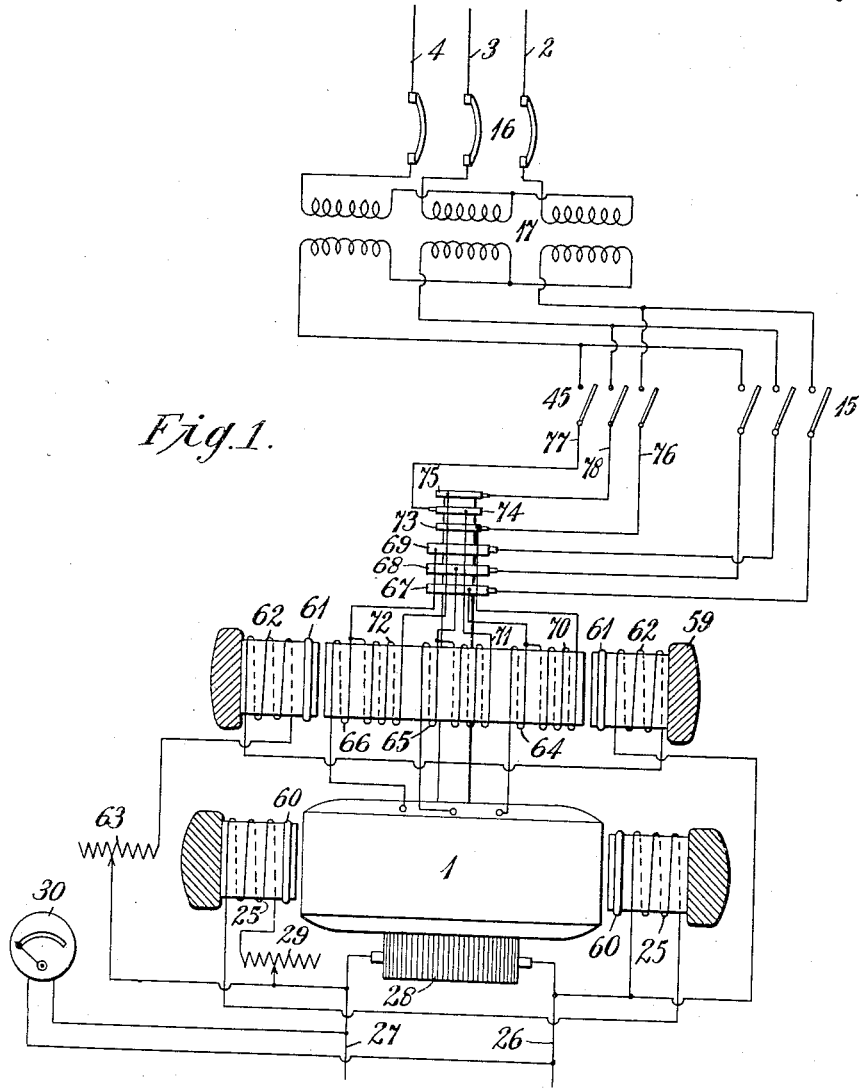

E. ROSENBERG.
MEANS FOR STARTING SYNCHRONOUS MACHINES.
APPLICATION FILED APR. 16, 1913.

1,231,651.

Patented July 3, 1917.

WITNESSES:
Fred H. Miller
W. R. Coley

INVENTOR
Emanuel Rosenberg
BY
Wesley G. Carr
ATTORNEY

UNITED STATES PATENT OFFICE.

EMANUEL ROSENBERG, OF COUNTY OF CHESTER, ENGLAND, ASSIGNOR TO WESTINGHOUSE ELECTRIC AND MANUFACTURING COMPANY, A CORPORATION OF PENNSYLVANIA.

MEANS FOR STARTING SYNCHRONOUS MACHINES.

1,231,651. Specification of Letters Patent. Patented July 3, 1917.

Application filed April 16, 1913. Serial No. 761,415.

*To all whom it may concern:*

Be it known that I, EMANUEL ROSENBERG, a subject of the Emperor of Austria, and a resident of Ivydene, Ashley Rd., in the county of Chester, England, have invented a new and useful Improvement in Means for Starting Synchronous Machines, of which the following is a specification.

My invention relates to synchronous dynamo-electric machines and it has for its object to provide improved methods and means for starting and simultaneously synchronizing the same.

Synchronous dynamo-electric machines, such as synchronous motors and rotary converters have heretofore been started either by mechanically connected motors or by connecting them to the mains, either directly or through step-down transformers for self starting. The pole pieces of a machine intended for self starting are usually fitted with dampers so that the machine will start similarly to a squirrel cage induction motor, and, when near synchronous speed, will pull into step. The first method has the disadvantage that, after the synchronous machine has attained the desired speed, it must be synchronized, an operation which may take some time and skill on the part of the operator; and the second method, while possessing the advantage that synchronization is not required, has the disadvantage that a large current is taken from the mains during part of the starting period. Furthermore, when said second method is employed with rotary converters, the brushes are apt to spark violently during the starting period because a considerable voltage exists on the armature, an appreciable part of which is short circuited by each brush. To avoid this difficulty, it has been proposed to lift the brushes during the starting period, thereby, however, entailing an undesirable mechanical complication. Another objection to the use of the second method with rotary converters is that the large alternating current passing into the armature may so demagnetize the field that, when the machine is brought into synchronism, the polarity may be reversed, thereby necessitating the use of pole-changing switches.

According to my present invention, an alternating current motor of any desired type is employed for starting the synchronous machine, but the disadvantageous feature hereinbefore mentioned is obviated by connecting the motor winding with the armature winding of the synchronous machine, either directly or through the use of transformers, so that, when the machine has attained the desired speed, it will be already in synchronism, thus avoiding a special synchronizing operation.

With this system of connections the synchronous machine may be started with much smaller current than would be required if it were connected directly to the line, thus entailing much less line disturbance and liability of field reversal.

When alternating current boosters are employed in combination with rotary converters for obtaining voltage regulation, I find that the booster may be employed as a starting motor, use being made either of the ordinary booster winding or, if less current drain on the line is desired, of a special high-voltage winding on the booster rotor.

I may, if desired, prevent the development of a strong field in a rotary converter during the starting operation by increasing the resistance of the field circuit, or by opening or even reversing the connections thereof. By these means, the starting motor is called upon to supply little energy except that consumed in friction and windage and a much quicker start may be made than would otherwise be the case. Furthermore, by the maintenance of a weak field, the electromotive force of the rotary converter may be kept at a low figure and sparking at the brushes prevented.

In order that the invention may be clearly understood, various arrangements embodying the same will now be more particularly described in detail with reference to the accompanying drawings, in which—

Figure 1 is a diagrammatic view showing a system of connections for starting and synchronizing a three-phase rotary converter coupled to an alternating current booster machine which is provided with a special starting winding; and Fig. 2 is a view in development of the starting and booster windings of the alternating current booster machine shown in Fig. 1.

In the system of connections illustrated in Figs. 1 and 2, the invention is applied to the well-known combination of a three-phase rotary converter 1 electrically connected to an alternating current booster machine 59 mounted on the same shaft. In this system, the field poles of the rotary converter and of the booster machine are preferably provided with closed-circuit damper coils 60 and 61, respectively. The rotary converter is shown provided with the usual field winding 25 connected, as in the system already described, to the direct current mains 26 and 27 through a rheostat 29, while the booster machine 59 has a field winding 62 also supplied from the direct current mains through a separate rheostat 63. The ordinary low-voltage boosting windings 64, 65 and 66 of the booster machine 59 are connected, as is usual, at one end, to the winding of the rotary converter 1 and, at the other end, to the main slip rings 67, 68 and 69 by which current is supplied to the combined machine during normal running from the low-tension side of the three-phase supply transformer 17 through the three-pole switch 15.

In order to adapt the booster machine 59 for employment as a starting and synchronizing motor, it is provided with three special starting windings 70, 71 and 72, which have comparatively many turns of relatively small wire and are supplied with current, when starting the rotary converter, through additional slip rings 73, 74 and 75. The winding 70 is connected, at one end, to one of the ordinary boosting windings, for instance, winding 64, and, at the other end, to the slip ring 73; the second starting winding 71 is connected, at one end, to the ordinary boosting winding 65 and, at the other end, to the slip ring 74, while the third starting winding 72 is similarly connected, at one end, to the boosting winding 66 and, at the other end, to the slip ring 75. The additional slip rings 73, 74 and 75, which may be of comparatively small dimensions, are connected to the low-tension side of the transformer 17 by means of conductors 76, 77 and 78 having a comparatively small cross section, and a three-pole starting switch 45. On closing the switch 45, the main low-tension switch 15 being first opened and the high-tension switch 16 closed, as before, current is supplied to the starting windings 70, 71 and 72 of the booster machine 59. By properly dimensioning these windings, the strength of the starting current may be made sufficiently great to enable the booster 59 to bring the rotary converter up to synchronous speed, but without being so great as to incur the above-mentioned disadvantages usually experienced with self-starting rotary converters. The arrangement of the starting and boosting windings of the alternating current booster machine 59 and the electrical connections between them can be easily understood from Fig. 2, in which these windings are shown developed, together with their respective connections to one another and to the supply circuit.

It is evident that my invention might advantageously be employed in many other uses of synchronous dynamo-electric machines besides those described and illustrated in the accompanying drawings; also that the invention is not limited to the employment of the above described particular types of starting motors, which have been mentioned by way of illustration. For instance, a repulsion motor, or any other kind of single phase motor, might be employed as the starting and synchronizing motor.

In the subjoined claims I shall employ the expression "in series relation" in referring to the windings of the main and auxiliary machines. I desire to convey thereby either the idea that the windings are in direct electrical series relation or that either or both of them are supplied by transformers which are in the circuit. In any case, the connections are such that there is an addition of the voltages consumed by each machine and a consequent maintenance of the current drain upon the line at a low figure.

For the above stated and other reasons, I do not wish to be restricted to the specific structures and systems of connections herein set forth, and I desire that only such limitations shall be imposed as are indicated in the appended claims.

I claim as my invention:

1. The combination with a synchronous dynamo-electric machine, of a second dynamo-electric machine mechanically associated and electrically connected in series circuit relation with said first machine, said second machine including an auxiliary armature winding also connected in series circuit relation with said first machine for starting and synchronizing the same.

2. The combination with a synchronous dynamo-electric machine, of a second dynamo-electric machine mechanically associated with said first machine, said second machine including a main and an auxiliary armature winding connected in series circuit relation with the armature winding of said first machine for starting and synchronizing the same, and means for eliminating said auxiliary winding after synchronous speed is attained.

3. The combination with a rotary converter, of a booster mechanically associated therewith, said booster including a main armature winding and an auxiliary armature winding connected in series circuit relation with the armature winding of said converter for starting and synchronizing the same, and means for electrically eliminating said auxiliary winding after synchronous speed is attained.

In testimony whereof, I have hereunto subscribed my name this 28th day of March, 1913.

EMANUEL ROSENBERG.

Witnesses:
N. W. BOWMAN,
JAS. STEWART BROADFOOT.

Copies of this patent may be obtained for five cents each, by addressing the "Commissioner of Patents, Washington, D. C."